US012516913B2

(12) United States Patent
Beck

(10) Patent No.: US 12,516,913 B2
(45) Date of Patent: Jan. 6, 2026

(54) SHIELD SYSTEM

(71) Applicant: TYR Tactical, LLC, Peoria, AZ (US)

(72) Inventor: Jason Beck, Peoria, AZ (US)

(73) Assignee: TYR Tactical, LLC, Peoria, AZ (US)

( * ) Notice: Subject to any disclaimer, the term of this patent is extended or adjusted under 35 U.S.C. 154(b) by 0 days.

(21) Appl. No.: 16/018,052

(22) Filed: Jun. 26, 2018

(65) Prior Publication Data

US 2019/0390941 A1 Dec. 26, 2019

(51) Int. Cl.

*F41H 5/08* (2006.01)
*B32B 7/08* (2019.01)
*B32B 7/12* (2006.01)
*F41H 5/04* (2006.01)

(52) U.S. Cl.

CPC ................ *F41H 5/08* (2013.01); *B32B 7/08* (2013.01); *B32B 7/12* (2013.01); *F41H 5/04* (2013.01); *B32B 2571/02* (2013.01); *F41H 5/0457* (2013.01)

(58) Field of Classification Search

CPC ... F41H 5/08; F41H 5/06; F41H 5/013; F41H 5/0492; F41H 5/04; F41H 5/0457; B32B 7/08

See application file for complete search history.

(56) References Cited

U.S. PATENT DOCUMENTS 1,895,197 A * 1/1933 Martinson ................ F41H 5/08 2/2.5
2,316,055 A * 4/1943 Davey ...................... F41H 5/08 2/2.5
3,370,302 A * 2/1968 Karlyn ..................... F41H 5/08 128/846
4,674,394 A * 6/1987 Martino .................... F41H 5/08 109/49.5
4,822,657 A * 4/1989 Simpson ................... B32B 7/02 428/69
5,241,703 A * 9/1993 Roberts ..................... F41H 5/08 109/49.5
5,273,607 A * 12/1993 O'Scanlon ............. B32B 27/08 40/594
5,850,052 A * 12/1998 Gabriel ..................... F41H 5/08 89/36.05
6,131,524 A * 10/2000 Nepper, Sr. ............... F41H 5/08 89/36.02
6,367,363 B1 * 4/2002 Widmont .................. F41H 5/08 89/36.02
6,367,943 B1 * 4/2002 Tocci ........................ F41H 5/08 362/103

(Continued)

FOREIGN PATENT DOCUMENTS

GB 191504376 A * 9/1915 ............... F41H 5/08
GB 108801 A * 8/1917 ............... F41H 1/02

(Continued)

*Primary Examiner* — Benjamin P Lee

(74) *Attorney, Agent, or Firm* — KW Law, LLP

(57) ABSTRACT

In various embodiments, a ballistic shield system may comprise a shield, a ballistic cover, and a fastening system. The shield may have a first curved profile and a first ballistic rating. The ballistic cover may have a second curved profile and a second ballistic rating. The fastening system may be configured to attach the ballistic cover to the shield. Moreover, the second curved profile may match the first curved profile.

13 Claims, 11 Drawing Sheets

(56) References Cited

U.S. PATENT DOCUMENTS

| | | | | | |
|---|---|---|---|---|---|
| 7,805,767 | B2 * | 10/2010 | McElroy | F41H 1/02 | 2/2.5 |
| 8,176,830 | B1 * | 5/2012 | Tan | F41H 5/0428 | 89/36.02 |
| 8,276,498 | B1 * | 10/2012 | Hannibal | F41H 5/08 | 89/36.05 |
| 10,060,709 | B2 * | 8/2018 | Bahu | F41H 5/08 | |
| 10,288,387 | B1 * | 5/2019 | Marcum | F41H 5/08 | |
| 10,794,665 | B1 * | 10/2020 | Taylor | B32B 5/18 | |
| 2007/0125224 | A1 * | 6/2007 | Thomas | F41H 5/08 | 89/36.07 |
| 2007/0283477 | A1 * | 12/2007 | Dovner | F41C 33/0209 | 2/2.5 |
| 2008/0087684 | A1 * | 4/2008 | Koshimoto | B65D 83/20 | 222/192 |
| 2009/0255037 | A1 * | 10/2009 | Sandusky | F41H 5/0492 | 2/455 |
| 2010/0083820 | A1 * | 4/2010 | Doyner | F41H 5/08 | 89/36.02 |
| 2011/0226123 | A1 * | 9/2011 | Priebe | F41H 5/08 | 89/36.02 |
| 2012/0152098 | A1 * | 6/2012 | Howland | B32B 5/022 | 264/339 |
| 2014/0233235 | A1 * | 8/2014 | Micarelli | F41H 5/08 | 362/253 |
| 2016/0231088 | A1 * | 8/2016 | Blackmore | F41H 5/0471 | |
| 2016/0273886 | A1 * | 9/2016 | O'Neal | F41H 1/02 | |
| 2017/0023334 | A1 * | 1/2017 | Banducci | F41H 5/08 | |
| 2018/0010890 | A1 * | 1/2018 | Waldrop | F41H 5/0435 | |
| 2018/0017360 | A1 * | 1/2018 | Adamow | F41H 5/26 | |
| 2018/0149450 | A1 * | 5/2018 | Macias | F41H 5/08 | |

FOREIGN PATENT DOCUMENTS

| | | | | | |
|---|---|---|---|---|---|
| JP | 2002181497 | A | * | 6/2002 | F41H 5/08 |
| JP | 2003269900 | A | * | 9/2003 | F41H 5/04 |
| JP | 2005090930 | A | * | 4/2005 | F41H 5/08 |
| JP | 2006329504 | A | * | 12/2006 | F41H 5/08 |
| JP | 2006329505 | A | * | 12/2006 | F41H 5/08 |
| WO | WO-2014186020 | A1 | * | 11/2014 | F41H 5/048 |

* cited by examiner

SHIELD SYSTEM

FIELD

The present disclosure relates to protective shields and more specifically to ballistic shield assemblies.

BACKGROUND

There is a need for a ballistic cover that can increase the ballistic rating of a shield. More specifically, there is a need for a ballistic cover with a curved profile to fit the curved profile of the ballistic shield.

SUMMARY

In various embodiments, a ballistic shield system may comprise a shield, a ballistic cover, and a fastening system. The shield may have a first curved profile and a first ballistic rating. The ballistic cover may have a second curved profile and a second ballistic rating. The fastening system may be configured to attach the ballistic cover to the shield. Moreover, the second curved profile of the ballistic cover may match, compliment and/or otherwise mate with the first curved profile of the shield. The ballistic shield system may further comprise a handle.

In various embodiments, the second ballistic rating of the ballistic cover may be greater than the first ballistic rating of the shield. Further, the ballistic rating of the shield system may be the second ballistic rating, in response to the ballistic cover being attached to the shield.

In various embodiments, the fastening system may be a fastener assembly. The fastening system may be a two-part system. For example, the fastening system may comprise a first portion disposed on the shield and a second portion disposed on the ballistic cover. Moreover, the fastening system may be at least one of a nut and bolt assembly, hook and loop material, a magnet assembly, a clip, and an adhesive. In various embodiments, the fastening system may be configured to retain at least a portion of the ballistic cover on the shield in response to the ballistic cover cracking.

In various embodiments, the second curved profile may be a concave profile.

In various embodiments, the shield may comprise a first portion, a second portion and a transition. The ballistic cover may comprise a third portion that substantially covers the first portion and a fourth portion that substantially covers the second portion. The transition may be configured to support an item being used by a user of the ballistic shield system.

In various embodiments, a shield assembly may comprise a shield, a ballistic cover, and a fastening system. The shield may comprise a first front and a first back. The shield may also have a first ballistic rating. The first front of the shield may have a first concave profile. The ballistic cover may comprise a second front and a second back. The ballistic cover may also have a second ballistic rating. The second back of the ballistic cover may have a second concave profile. The second concave profile of the ballistic cover may be configured to mate with, cover, and/or attached to the first concave profile of the first front of the shield. The fastening system may be configured to attach the ballistic cover to the shield.

In various embodiments, the fastening system may be two-part system, having a first part and a second part. More specifically, the first part of the fastening system may be operatively coupled to the first front of the shield. The second part of the fastening system may be operatively coupled to the second back of the ballistic cover. In various embodiments, the fastening system may be, for example, a nut and bolt assembly, hook and loop material, a magnet assembly, a clip, an adhesive, and/or the like.

In various embodiments, the shield may be made of a first material and the ballistic cover may be made of a second material.

In various embodiments, a ballistic tile may comprise a body having a front surface and a back surface. The back surface may have a curved profile. The body may be configured to mate with a curved shield to increase the ballistic rating of the shield. The body may be sized to cover at least 50 percent of a surface area of the curved shield. The curved profile may be a concave profile.

In various embodiments, the ballistic tile is attachable to the shield with a fastening system. The fastening system may be a two-part system. The fastening system may be, for example, a nut and bolt assembly, hook and loop material, a magnet assembly, a clip, an adhesive, and/or the like.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the inventions, other embodiments may be realized, and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure is directed to a ballistic shield system. The ballistic shield system is generally configured to improve the ballistic capability of a traditional shield by adding a ballistic cover or tile to increase the ballistic capabilities of a traditional ballistic shield. Ballistic shields with generally flat profiles have been used to protect users. However, flat profile shields do not provide the same level of coverage as curved profile shields. Moreover, covers or tiles used to increase the ballistic rating of a shield have not been made with curved profiles, because the materials that are used to make the covers are difficult to process.

Figure 1A:
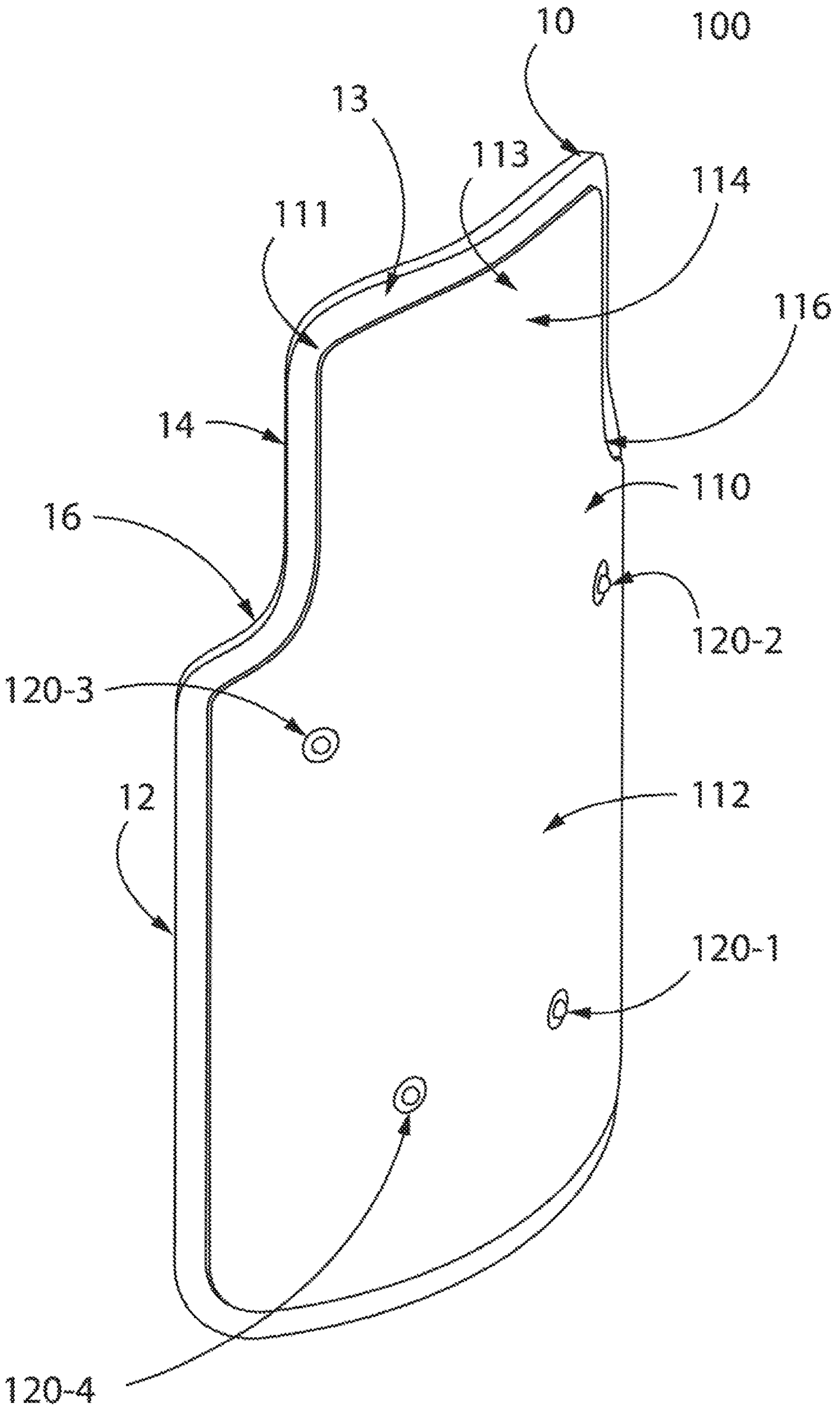
FIG. 1A illustrates a front perspective view of a ballistic shield system with a first attachment system, in accordance with various embodiments.
Figure 1B:
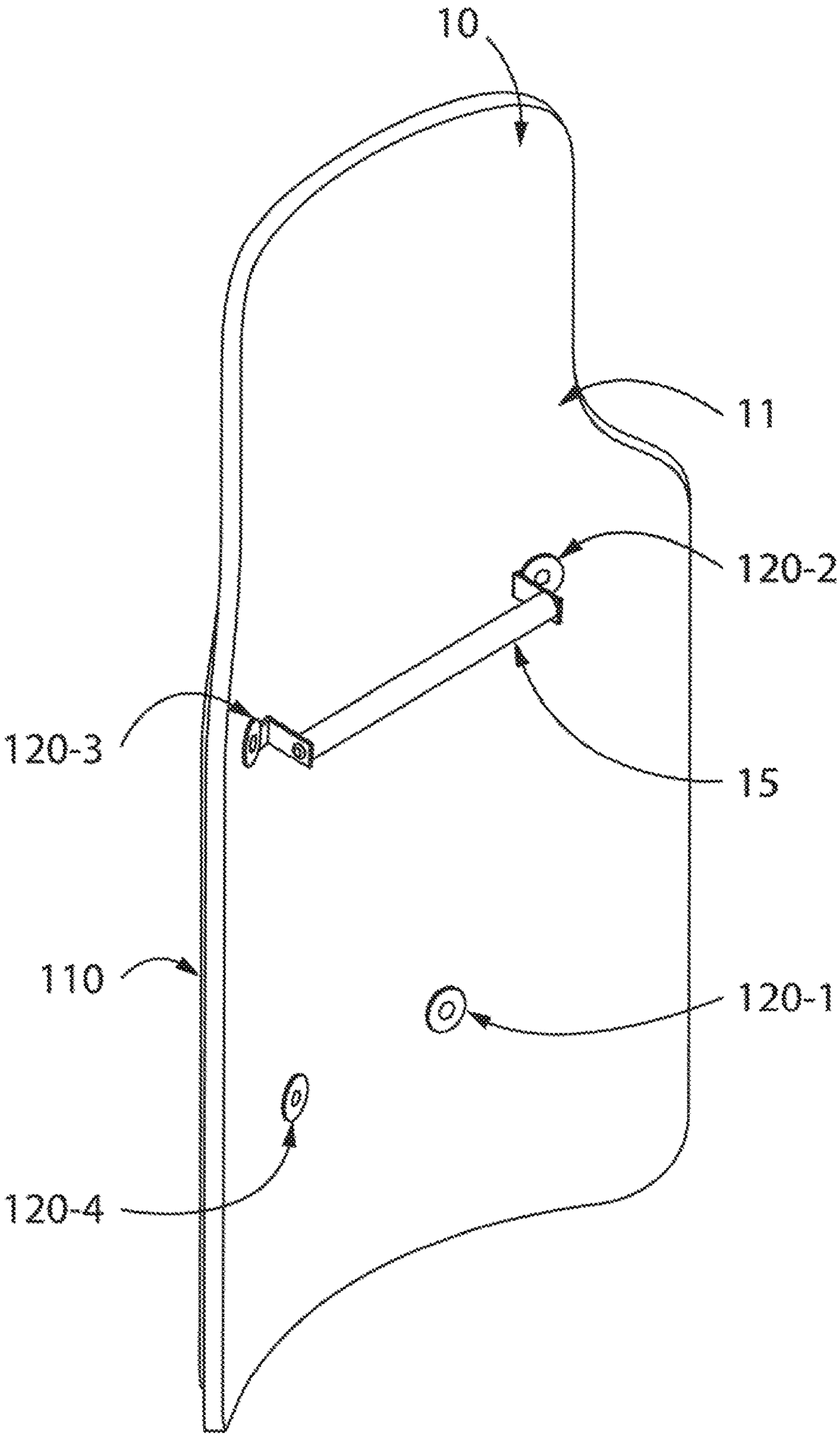
FIG. 1B illustrates a back perspective view of a ballistic shield system with a first attachment system, in accordance with various embodiments.

In various embodiments and with reference to FIGS. 1A and 1B, a ballistic shield system 100 comprises a shield 10 and a ballistic cover or tile 110. The ballistic cover 110 may be attached to shield 10 by a fastening system. The fastening system may be any suitable system configured to attach and/or retain ballistic cover 110 to shield 10. In this regard, ballistic cover 110 may be configured to mate with and/or otherwise uniformly contact shield 10. The uniform contact between ballistic cover 110 and shield 10 may reduce the risk of a ballistic void or penetration zone being present in ballistic shield system 100.

In various embodiments, shield 10 may have a curved profile. For example, shield 10 may have a concave profile. Shield 10 may also have a surface that curves inward similar to the interior of a circle or sphere. More specifically, back 11 of shield 10 may have a curved profile such that is surrounds the user. Ballistic cover 110 may have a complementary shape. In this regard, ballistic cover 110 may compliment or mate with shield 10.

In various embodiments and with continued reference to FIGS. 1A and 1B, shield 10 may have a back 11 and a front 13. Moreover, shield 10 may have a first portion 12 and a second portion 14. First portion 12 and second portion 14 may be defined separately from each other. First portion 12 and second portion 14 may be joined by a transition 16. Similarly, ballistic cover 110 may have a back 111 and a front 113 opposite back 111. Ballistic cover 110 may also have a third portion 112 and a fourth portion 114 that are defined separately from each other and are operatively connected to one another via a transition 116. In this regard, third portion 112 may be substantially the same shape and size as first portion 12 of shield 10. Similarly, fourth portion 114 of ballistic cover 110 may be substantially the same size and shape as second portion 14 of shield 10.

In various embodiments, front 13 of shield 10 may be configured to operatively engage, fasten to, support, and/or otherwise mate with back 111 of ballistic cover 110. In this regard, the front 13 may have a complimentary profile to back 111 such that they mate and/or contact one another. The complimentary profiles insure that there is uniform contact and/or support between front 13 and back 111. This uniform contact minimizes the occurrence of ballistic voids between shield 10 and ballistic cover 110. A ballistic void is present when there is a gap between the shield and ballistic cover. The gap reduces the ballistic capability of the overall shield system and increases the risk of a penetration of and/or to ballistic shield system 100.

In various embodiments, shield 10 may be made of a first material and ballistic cover 110 may be made of a second material. For example, shield 10 may be made of a bullet resistant steel or a composite material. Shield 10 may have a first ballistic rating based on the material that shield 10 is made from. Ballistic cover 110 may be made from a second material such as, for example, ultra-high-molecular-weight polyethylene (UHMWPE, UHMW) (e.g., DYNEEMA® composite material and/or the like), other pre-impregnated aramid fibers (e.g., KEVLAR®, NOMEX®, TECHNORA®, and/or the like) or heat resistant, high strength composite fibers. Ballistic cover 110 may also be made of and/or from a composite, metal, ceramic and/or of other suitable heat resistant, high strength materials.

In various embodiments, shield 10 may be configured with handle 15 in operation. A user may grab and support shield 10 in front of her body. The curved profile of shield 10 generally provides greater coverage than a shield with a flat profile. Moreover, the user of shield 10 may hold shield 10 with one hand at handle 15 and may hold another device such as, for example, a firearm, camera, and/or the like with the other hand.

In various embodiments and with continued reference to FIGS. 1A and 1B, ballistic shield system 100 may comprise a fastening system 120. Fastening system 120 may be configured to attach, join, fasten, and/or otherwise operatively couple ballistic cover 110 to shield 10. In this regard, fastening system 120 may be configured to permanently or removably couple ballistic cover 110 to shield 10. Fastening system 120 may be one or more fasteners or fastener assemblies or fastener systems 120. Fastener assembly 120 may include a nut and bolt with one or more washers. Fastener assembly 12 may be included in a plurality of locations on shield 10 and ballistic cover 110 and/or as part of ballistic shield system 100. For example, fastener system 120-1, fastener system 120-2, fastener system 120-3, and fastener system 120-4, may be disposed over and/or disposed separately from one another and may be configured to pass through portions of shield 10 and ballistic cover 110 to form a ballistic shield system 100. Moreover, fastener assembly 120 may be made of a suitable material such as hardened steel.

Figure 2A:
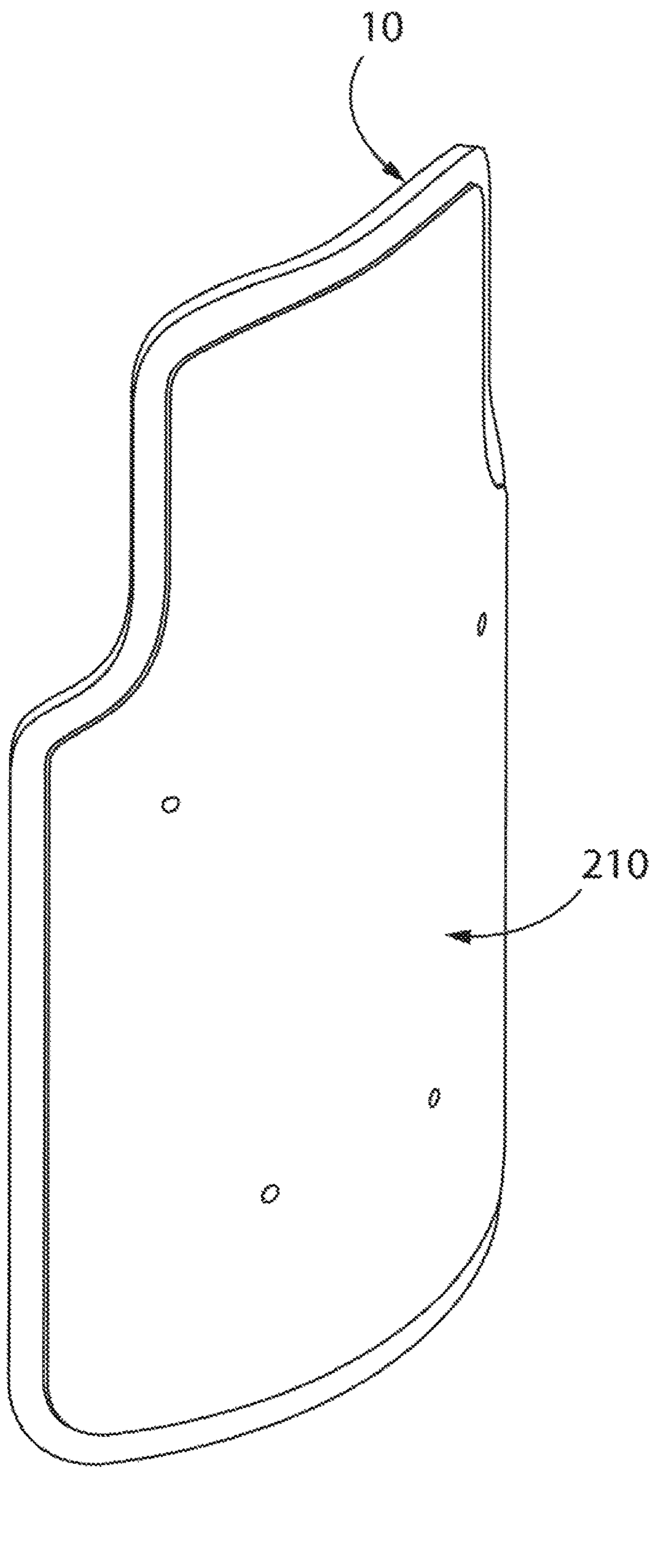
FIG. 2A illustrates a front perspective view of a ballistic shield system with a second attachment system, in accordance with various embodiments.
Figure 2B:
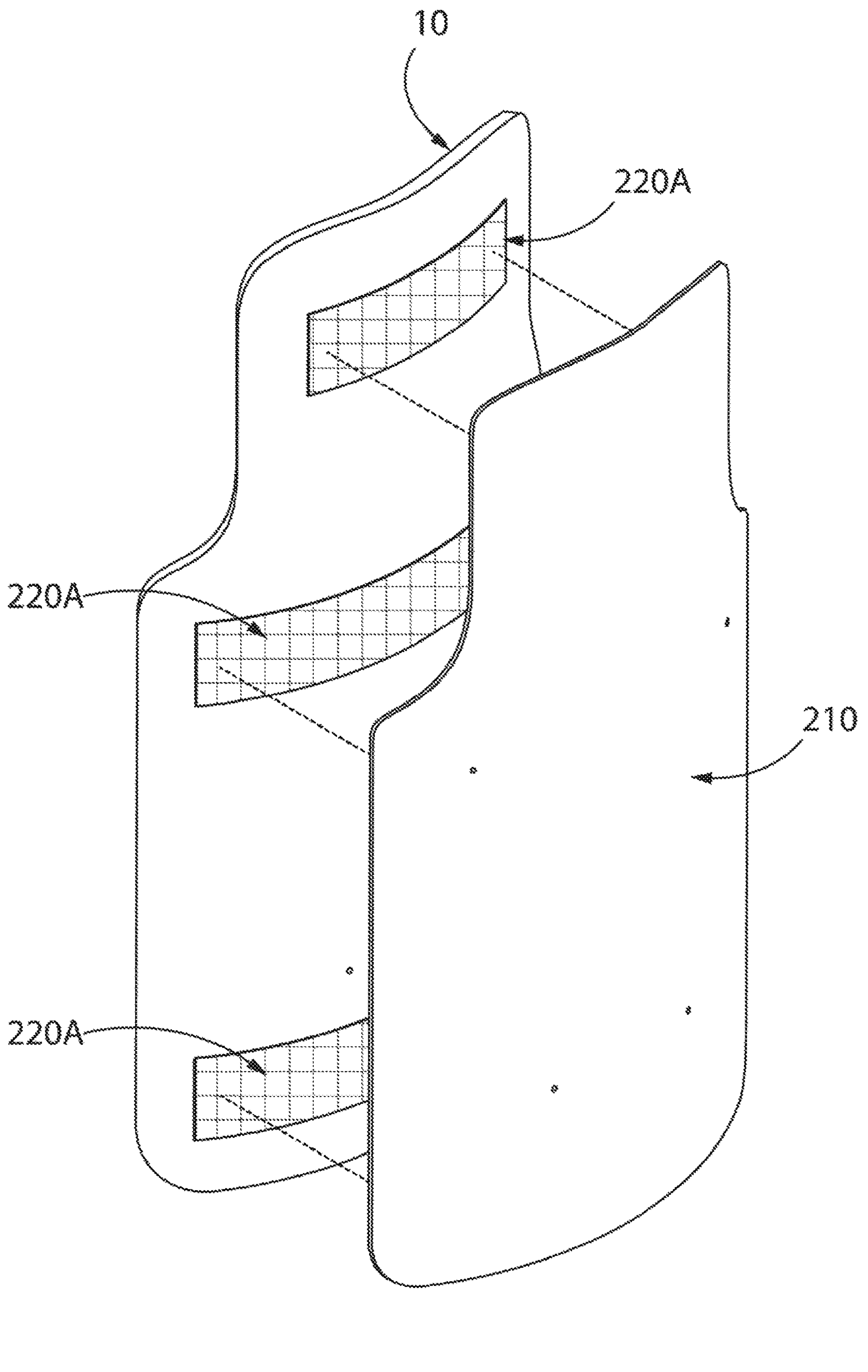
FIG. 2B illustrates a front exploded perspective view of a ballistic shield system with a second attachment system, in accordance with various embodiments.
Figure 2C:
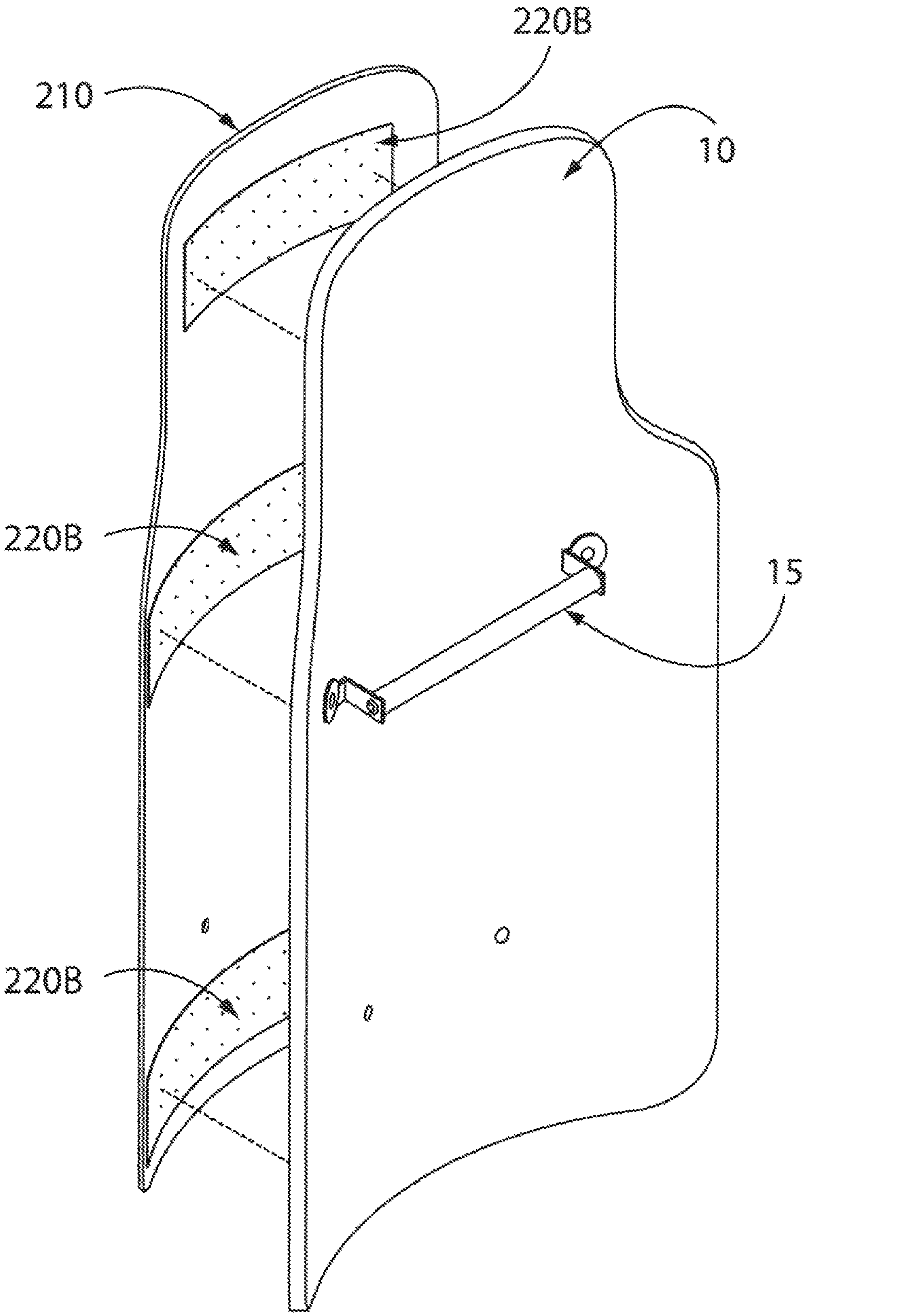
FIG. 2C illustrates a back exploded perspective view of a ballistic shield system with a second attachment system, in accordance with various embodiments.

In various embodiments and with reference to FIGS. 2A, 2B, and 2C, fastener system 220 may maybe one or more pieces of a hook and loop assembly. In this regard, fastener system 220 may be two-piece assembly, including first piece 220A and second piece 220B. First piece 220A of fastener system 220 may be configured in or disposed on shield 10. Second piece 220B of fastener system 220 may be disposed on or attached to ballistic cover 210. Moreover, fastener system 220 may be disposed at multiple points on shield 10 and/or ballistic cover 210 to provide appropriate coverage and support when ballistic cover 210 is attached to shield 10.

In various embodiments and with continued reference to FIGS. 2A, 2B, and 2C, ballistic cover 210 may be retained on shield 10 in the event that ballistic cover 210 cracks or fractures in response to a high energy event (e.g., a projectile/bullet impact). Because fastener system 220 has a distributed engagement, ballistic cover 210 may be retained over an area. More specifically, ballistic cover 210 may be retained in response to cracking or fracturing because of the disturbed engagement of fastener system 220. In this regard, ballistic shield system 200 may maintain some or all of its ballistic capabilities in response to ballistic cover 210 experiencing a failure (e.g., the cracking or fracturing of ballistic cover 210) maintaining the performance of ballistic cover 210 because ballistic cover 210 is retained on shield 10 by fastener system 220.

Figure 3:
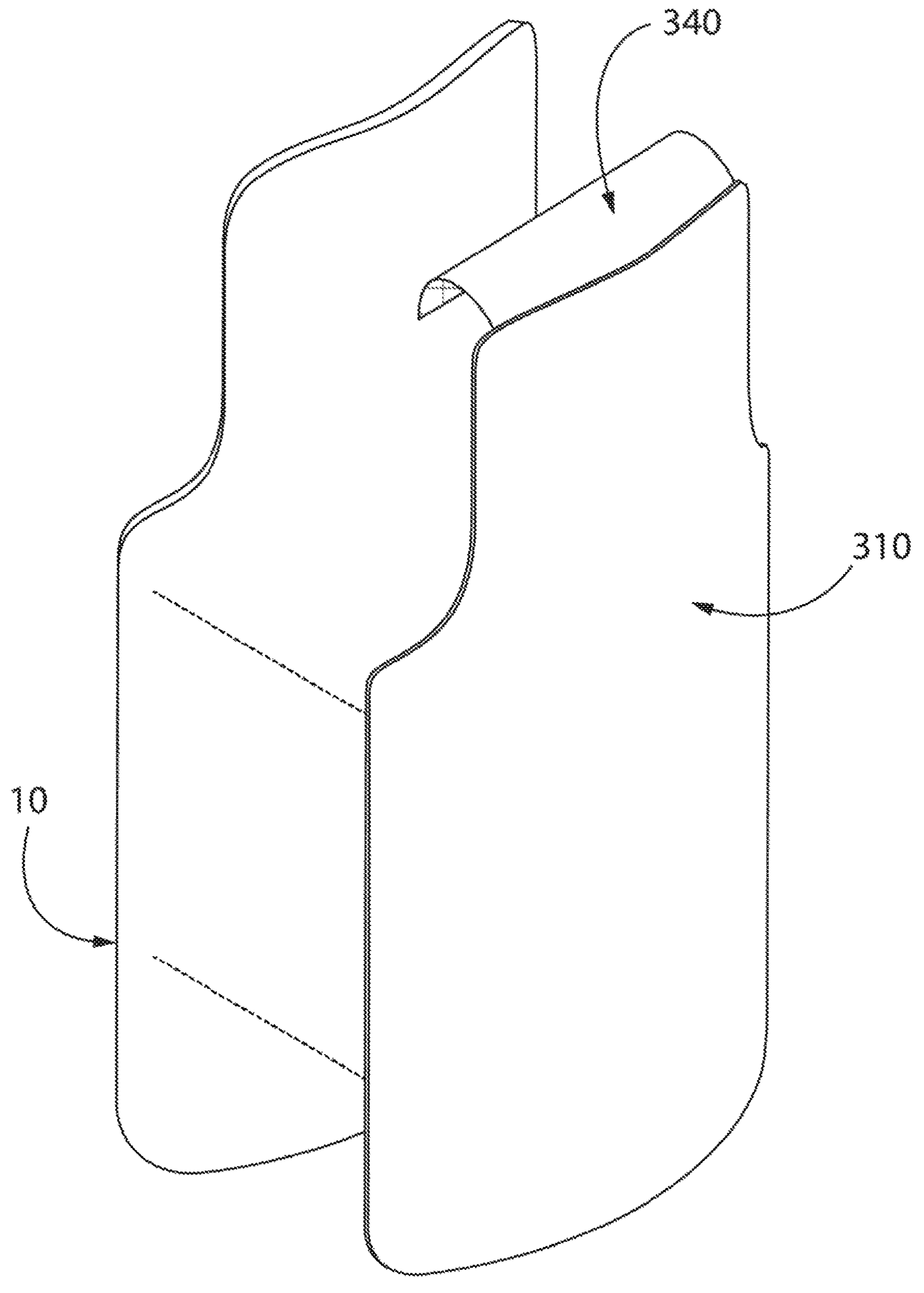
FIG. 3 illustrates a front exploded perspective view of a ballistic shield system with a third attachment system, in accordance with various embodiments.

In various embodiments and with reference to FIG. 3, ballistic cover 310 may be configured with a structure that facilitates attachment of ballistic cover 310 to shield 10. For example, ballistic cover 310 may include a hook 340 that is formed in ballistic cover 310. Hook 340 may be configured to engage and/or overlap shield 10 in response to ballistic cover 310 being installed on shield 10.

In various embodiments, ballistic shield system 300 may have a hybrid fastening system. In this regard, any of the fastening systems described herein may be employed together in whole or in part with other fastening systems and/or structures of shield 10 or the ballistic covers described herein. For example, the fastening system may include one or more mechanical fasteners (e.g. a nut in a bolt), a structure formed in the ballistic cover 310, and/or a fastening system like hook and loop device disclosed herein.

Figure 4:
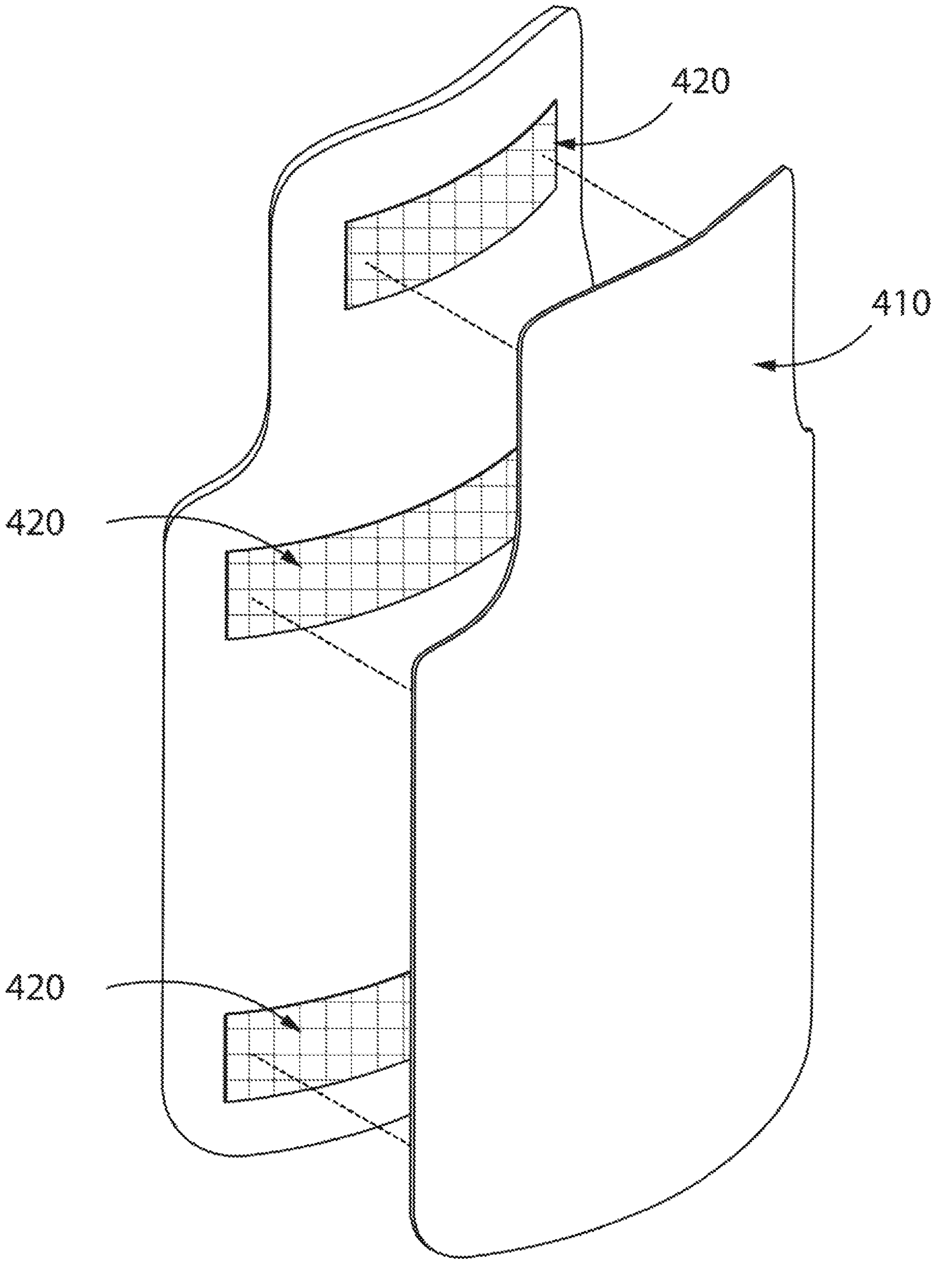
FIG. 4 illustrates a front exploded perspective view of a ballistic shield system with a fourth attachment system, in accordance with various embodiments.

In various embodiments and with reference to FIG. 4, ballistic cover 410 may be attached to shield 10 by one or more alternative methods. For example, shield 10 and/or ballistic cover 410 may be configured to attach to one another with a fastener system 420 that uses adhesive 420 that may be disposed on ballistic cover 410 and/or shield 10. In response to ballistic cover 410 being applied to shield 10, ballistic cover 410 and shield 10 may form a single assembly and become ballistic shield system 400. Moreover, shield 10 and/or ballistic cover 410 may be configured to attach to one another with a fastener system 420 that uses one or more magnets 420. The other device may be fitted with ferrous metal to create a magnetic connection between ballistic cover 410 and shield 10. Moreover, fastener system 420 may be disposed at multiple points on shield 10 and/or ballistic cover 210 to provide appropriate coverage and support when ballistic cover 110 is attached to shield 10.

Figure 5A:
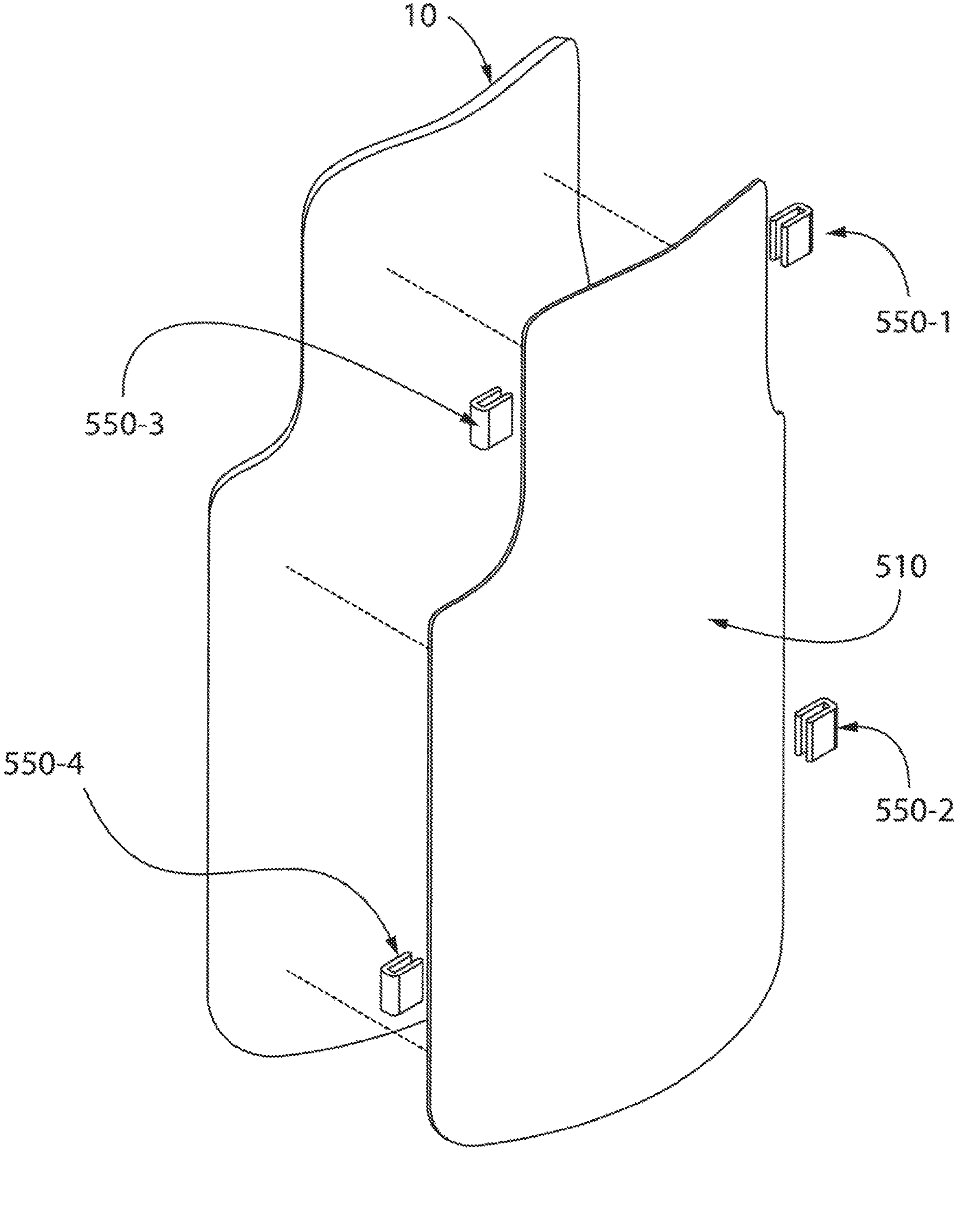
FIG. 5A illustrates a front exploded perspective view of a ballistic shield system with a fifth attachment system, in accordance with various embodiments.
Figure 5B:
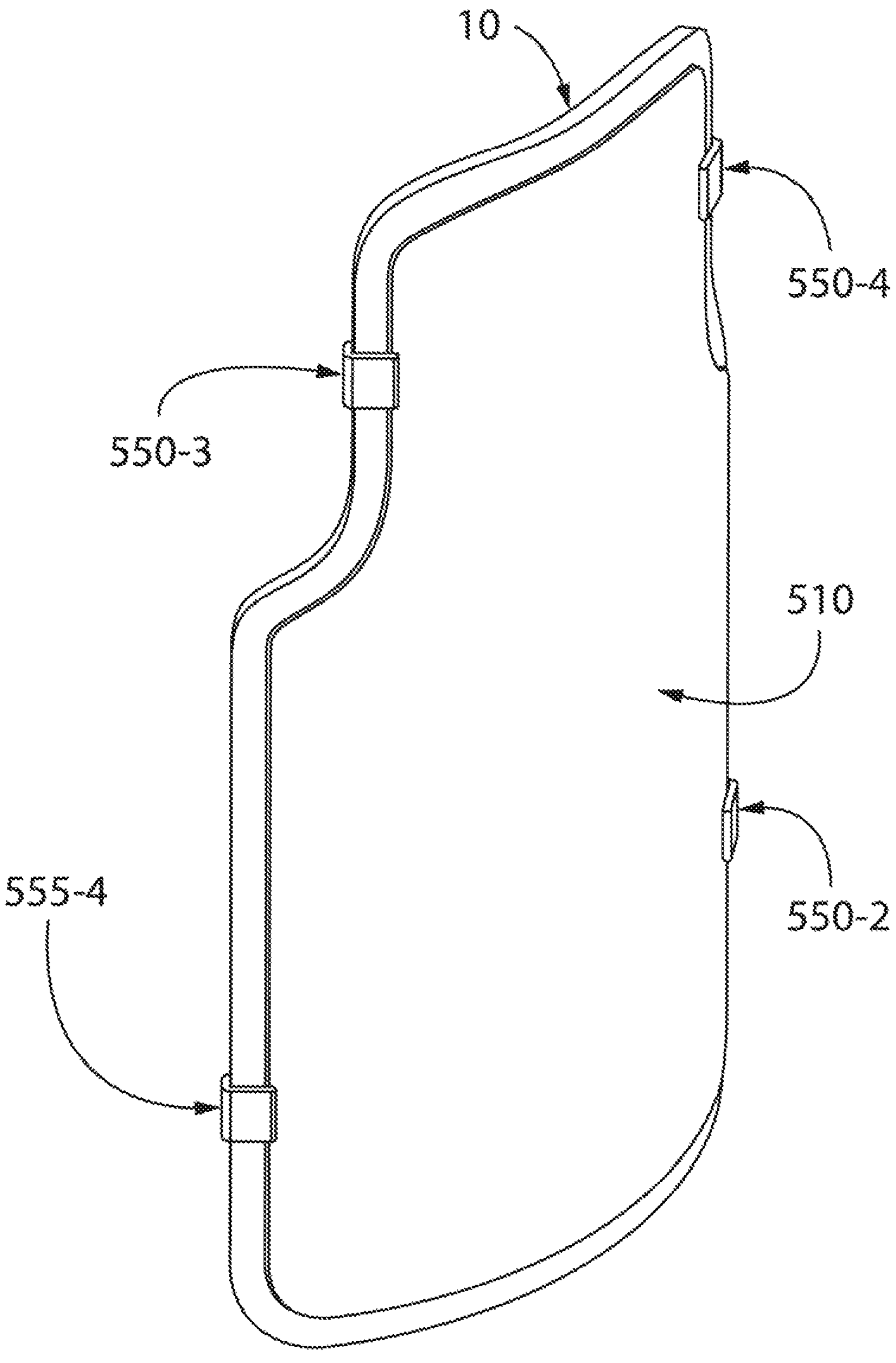
FIG. 5B illustrates a front assembled perspective view of a ballistic shield system with a fifth attachment system, in accordance with various embodiments.

In various embodiments and with reference to FIGS. 5A and 5B, ballistic cover 510 may be operatively coupled to shield 10 to form ballistic shield system 500 by employing one or more clip structures 550. Clip structures 550 may be configured to engage the back of shield 10 and the front of ballistic cover 510 to operatively engage and/or retain ballistic cover 510 on shield 10. For example, clip structure 550-1, clip structure 550-2, clip structure 550-3, clip structure 550-4 and/or the like, may be used to create a fastening system as described herein to operatively couple shield 10 and ballistic cover 510 to one another.

Figure 6:
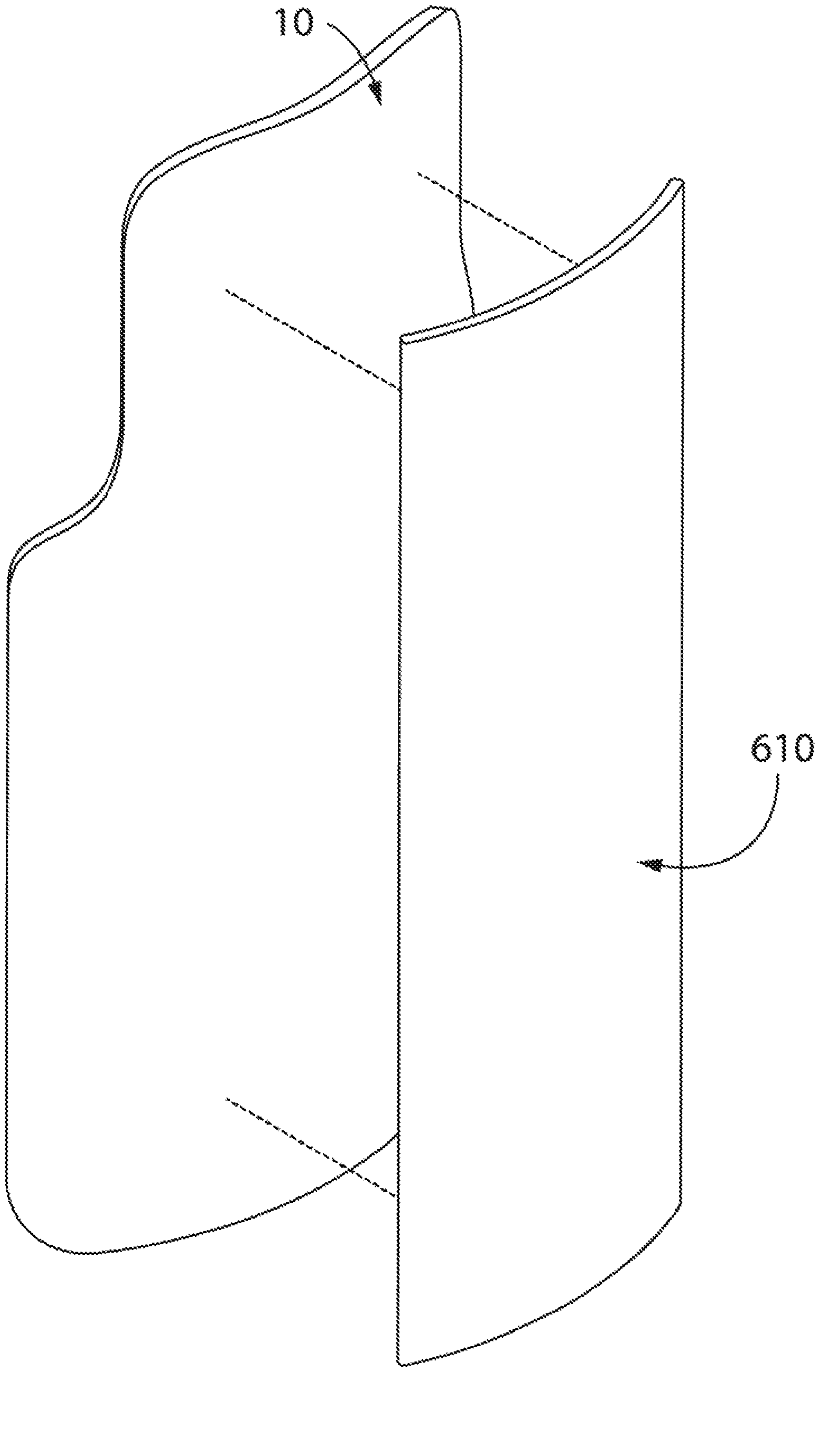
FIG. 6 illustrates a front exploded perspective view of a ballistic shield system with an alternative cover shape, in accordance with various embodiments.

In various embodiments and with reference to FIG. 6, ballistic cover 610 may be any suitable size. In this regard, ballistic cover 610 may have a cover profile and a substantially uniform shape. For example, ballistic cover 610 may have a shape or profile that is a portion of a cylinder. Moreover, in a first configuration, ballistic cover 610 may be sized such that at least 90% of the surface area of shield 10 is covered with ballistic cover 610. In a second configuration, ballistic cover 610 may be sized such that at least 80% to 90% of the surface area of shield 10 is covered with ballistic cover 610. In a third configuration, ballistic cover 610 may be sized such that at least 70% to 80% of the surface area of shield 10 is covered with ballistic cover 610. In a forth configuration, ballistic cover 610 may be sized such that at least 60% to 70% of the surface area of shield 10 is covered with ballistic cover 610. In a fifth configuration, ballistic cover 610 may be sized such that at least 60% to 70% of the surface area of shield 10 is covered with ballistic cover 610. In a sixth configuration, ballistic cover 610 may be sized such that at least 50% to 60% of the surface area of shield 10 is covered with ballistic cover 610. In a seventh configuration, ballistic cover 610 may be sized such that at least 40% to 50% of the surface area of shield 10 is covered with ballistic cover 610. In a seventh configuration, ballistic cover 610 may be sized such that at least 50% of the surface area of shield 10 is covered with ballistic cover 610.

Figure 7:
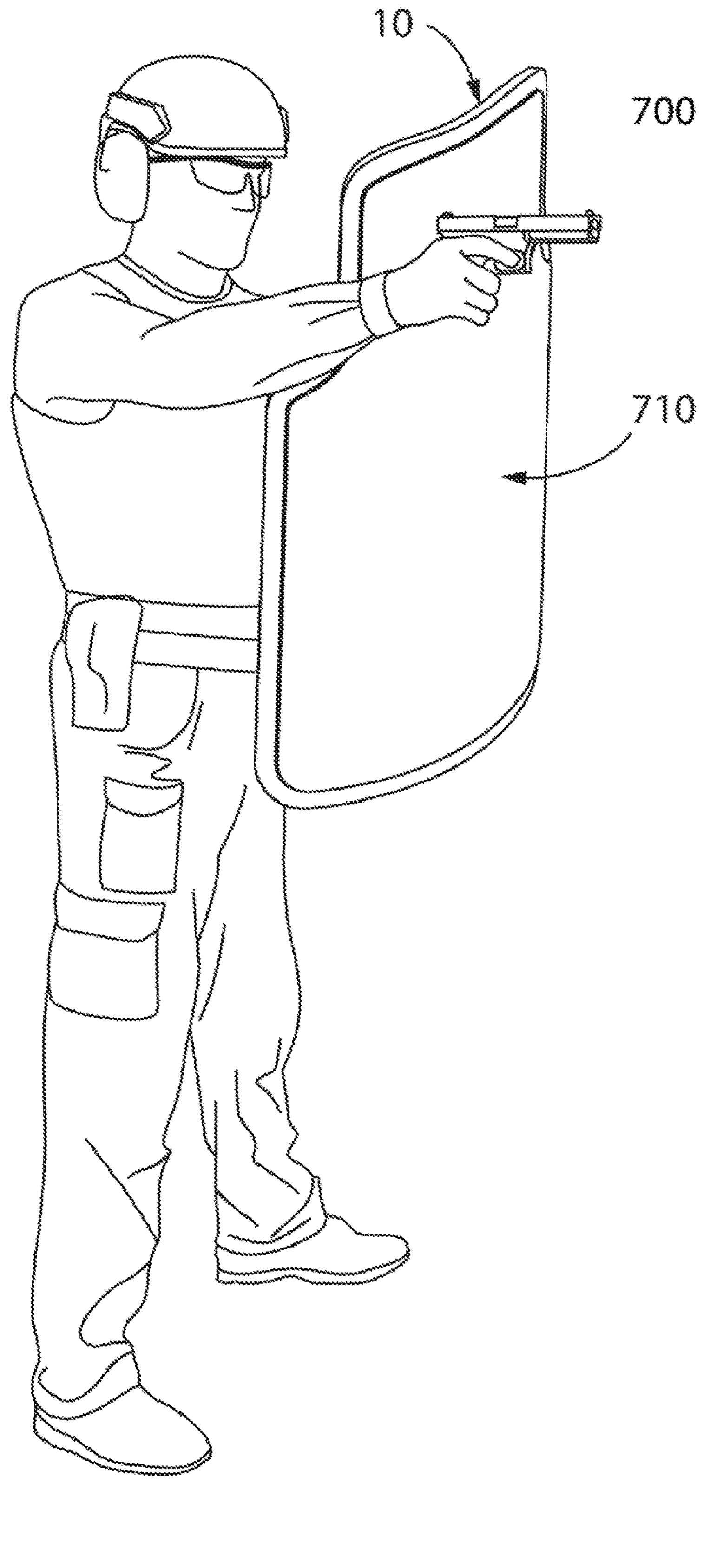
FIG. 7 illustrates a front perspective view of a ballistic shield system with a user, in accordance with various embodiments.

In various embodiments and with reference to FIG. 7, shield system 700 including shield 10 and ballistic cover 710 may be used by a user to at least partially surround and/or protect a user. The user may use portion of shield 10 (e.g., the transition) as described herein to support various items or portions of the user anatomy during use.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ballistic shield system, comprising:

a rigid shield having a first curved profile and a first ballistic rating, the shield having a front defining a first surface area, a first perimeter profile and a back;

an ultra-high-molecular-weight polyethylene ballistic tile having a second curved profile and a second ballistic rating the second ballistic rating being higher than the first ballistic rating, the ballistic tile having a back defining a second surface area and a second perimeter profile, wherein the second surface area is less than the first surface area, and wherein the first perimeter profile matches the second perimeter profile; and a handle disposed on the back;

a fastening system configured to attach the ballistic tile to a front of the shield, the fastening system configured to maintain the second ballistic rating, wherein the second curved profile matches the first curved profile to provide a uniform contact to minimize the occurrence of ballistic voids, and wherein ballistic rating of the shield system is the second ballistic rating, in response to the ballistic tile being attached to the shield.

2. The ballistic shield system of claim 1, wherein the fastening system is a fastener assembly.

3. The ballistic shield system of claim 1, wherein the fastening system comprises a first portion disposed on the shield and a second portion disposed on the ballistic tile.

4. The ballistic shield system of claim 1, wherein the fastening system is at least one of a nut and bolt assembly, hook and loop material, a magnet assembly, a clip, and an adhesive.

5. The ballistic shield system of claim 1, wherein the second curved profile is a concave profile.

6. The ballistic shield system of claim 1, wherein the shield comprises a first portion, a second portion and a transition, and the ballistic tile comprises a third portion that substantially covers the first portion and a fourth portion that substantially covers the second portion.

7. The ballistic shield system of claim 6, wherein the transition is configured to support an item being used by a user of the ballistic shield system.

8. The ballistic shield system of claim 1, wherein the fastening system is configured to retain at least a portion of the ballistic tile on the shield in response to the ballistic tile cracking.

9. A shield assembly, comprising:

a rigid, metal shield comprising a first front and a first back, the shield having a first ballistic rating, wherein the first front has a first concave profile and a first surface area;

an ultra-high-molecular-weight polyethylene ballistic tile comprising a second front and a second back, the ballistic tile having a second ballistic rating, wherein the second back has a second concave profile and a second surface area, wherein the second concave profile mates with the first concave profile in uniform contact, and wherein the second surface area is less than the first surface area; and a handle disposed on the first back;

a fastening system configured to attach the ballistic tile to the shield, the fastening system configured to maintain the second ballistic rating, wherein ballistic rating of the shield assembly is the second ballistic rating, in response to the ballistic tile being attached to the shield.

10. The shield assembly of claim 9, wherein the fastening system is a two-part system comprising a first part and a second part.

11. The shield assembly of claim 10, wherein the first part is operatively coupled to the first front and the second part is operatively coupled to the second back.

12. The shield assembly of claim 9, wherein the shield is a first material and the ballistic tile is a second material.

13. The shield assembly of claim 9, wherein the fastening system is at least one of a nut and bolt assembly, hook and loop material, a magnet assembly, a clip, and an adhesive.

* * * * *